March 20, 1956
A. E. COREY ET AL
2,739,173
SYNTHESIS OF GLYCERIN
Filed Aug. 21, 1952
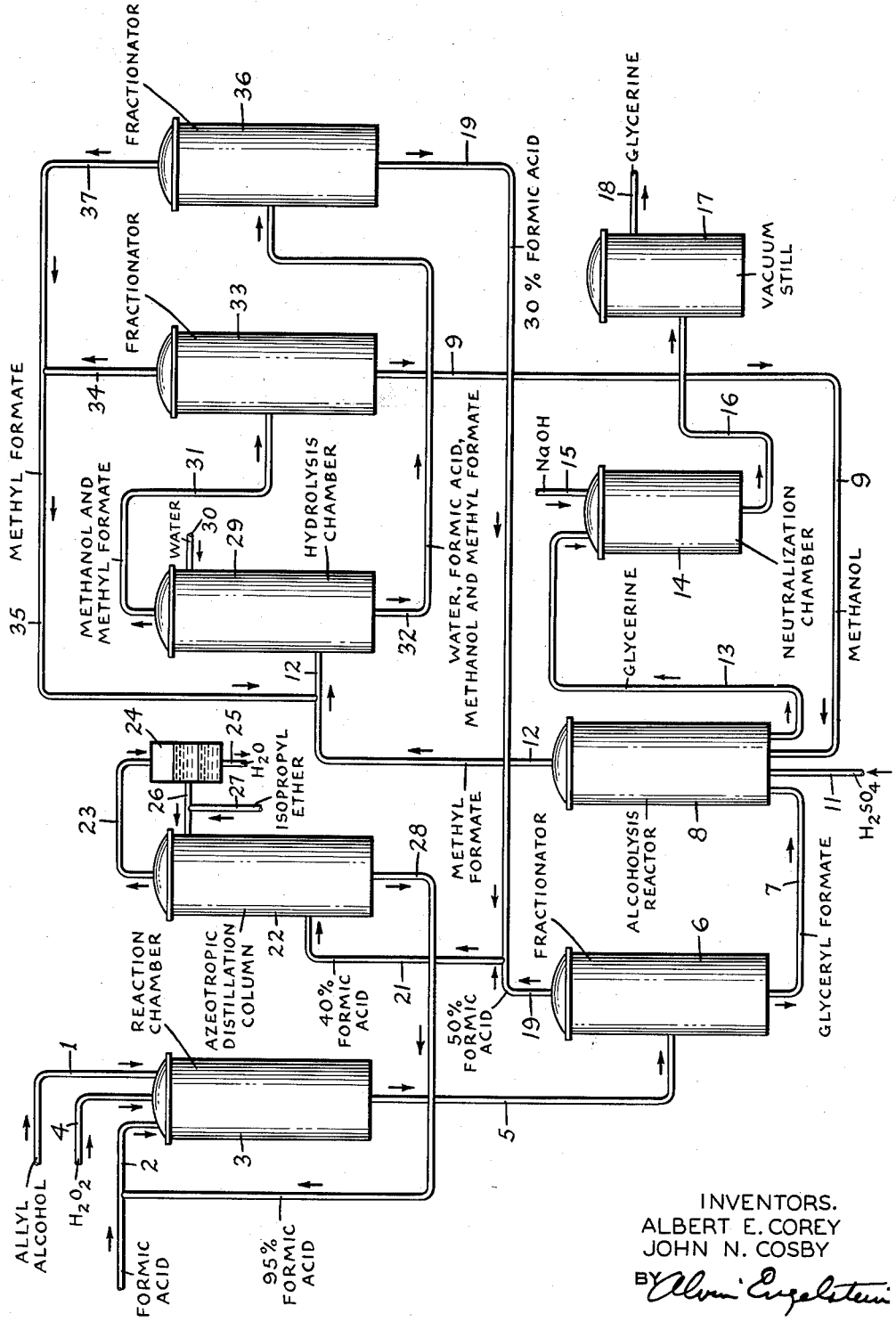
INVENTORS.
ALBERT E. COREY
JOHN N. COSBY
BY Alvin Engelstein
ATTORNEY.

United States Patent Office 2,739,173
Patented Mar. 20, 1956

---

2,739,173

SYNTHESIS OF GLYCERIN

Albert E. Corey, Morristown, and John N. Cosby, Morris Township, Morris County, N. J., assignors to Allied Chemical & Dye Corporation, New York, N. Y., a corporation of New York Application August 21, 1952, Serial No. 305,532

5 Claims. (Cl. 260—635)

This invention relates to the synthesis of glycerin and more particularly refers to a new and improved method of converting allyl alcohol to glycerin.

Glycerin, a very large tonnage chemical, has continued to become more scarce in supply, and as a result, the price has increased to a very high level. Since glycerin is largely a by-product of the soap industry, which is relatively limited in growth by the development of synthetic detergents, the increase in demand must be met by synthetic glycerin. Despite many past efforts, today only one process for the manufacture of synthetic glycerin has attained commercial success. This process involves chlorinating allyl alcohol, hydrolysis of the chlorinated compound, neutralization with an alkali followed by separation and purification of the glycerin product. An appreciable amount of by-products are produced in this process as a result of side reactions. Also in this process chlorine and alkali, are consumed in large quantities.

Direct conversion of unsaturated compounds to the corresponding αβ-glycols is termed hydroxylation. The reaction has been known for quite a long time and many reagents are capable of giving hydroxylation. The reaction has been carried out in a number of ways, such as oxidation with permanganates, chlorates, peracids or by the direct addition of hydrogen peroxide. Unfortunately, due to low yields, slow reaction time, high cost of reagents or difficulties in product isolation, such processes have found no practical use in the preparation of commercial large-tonnage glycerin.

One object of the present invention is to provide an efficient, economical process for converting allyl alcohol to glycerin.

Another object of this invention is to provide an improved method of producing glycerin from allyl alcohol in yields of 90–95% and higher by hydroxylation with hydrogen peroxide.

A further object of this invention is to provide an improved method of recovering glycerin from the reaction products resulting from the hydroxylation of allyl alcohol with hydrogen peroxide.

A still further object of the present invention is to provide a unitary system for the synthesis of glycerin from allyl alcohol by hydroxylation with hydrogen peroxide and the recovery of increased yields of substantially pure glycerin with a minimum of by-products.

Further objects and advantages will be apparent from te following description and drawing.

In accordance with the present invention, synthesis of glycerin may be accomplished by admixing allyl alcohol, formic acid and hydrogen peroxide in such proportions that said constituents shall constitute more than 80% of the total reaction mixture and preferably more than 90% of the reaction mixture, thereby effecting hydroxylation of the allyl alcohol to produce glycerol formate, distilling an aqueous solution of formic acid from the reaction mixture, dehydrating the dilute formic acid solution by means of an azeotropic distillation, recycling the thus produced concentrated formic acid to effect further hydroxylation of allyl alcohol, admixing methyl alcohol and a small amount of acid with the reaction product containing glycerol formate to effect alcoholysis of the glycerol formate, neutralizing the thus produced glycerin, vacuum distilling the neutralized glycerin, hydrolyzing the methyl formate to methanol and formic acid and returning the methanol to the alcoholysis stage and the formic acid to the azeotropic distillation stage.

One specific embodiment of the present invention comprises admixing approximately molal proportions of allyl alcohol and hydrogen peroxide in the presence of formic acid having a concentration in excess of 90%, preferably in excess of 95%, said allyl alcohol, hydrogen peroxide and formic acid constituting at least 90% of the total reaction mixture, maintaining the mixture at a temperature below 70° C., preferably between 40 and 50° C. for a sufficient length of time to effect substantially complete hydroxylation of the allyl alcohol to produce glycerol formate, subjecting the reaction mixture to distillation to remove as vapors a dilute aqueous solution of formic acid from the reaction mixture, subjecting the dilute formic acid solution to azeotropic distillation employing isopropyl ether as the entrainer to produce concentrated formic acid, recycling the concentrated formic acid with additional allyl alcohol and hydrogen peroxide to effect further hydroxylation of the allyl alcohol, admixing methyl alcohol and a small amount of sulfuric acid with the reaction product containing glycerol formate from the distillation to convert the glycerol formate by alcoholysis to glycerin and methyl formate, neutralizing the thus produced glycerin with sodium hydroxide, vacuum distilling the neutralized glycerin to produce a purified glycerin product, hydrolyzing the methyl formate from the alcoholysis reaction by heating the methyl formate to a temperature in the range of about 75–150° C., separating by fractionation the methanol and formic acid from the hydrolyzed methyl formate, recycling the methanol for further alcoholysis reaction with glycerol formate, concentrating the formic acid by azeotropic distillation with isopropyl ether and returning the concentrated formic acid for admixture with additional allyl alcohol and hydrogen peroxide.

The accompanying drawing is a diagrammatic flow sheet illustrating one method of practicing the invention.

Referring to the drawing, allyl alcohol and formic acid, the latter in large excess over the former, preferably in an amount in excess of 5 volumes of formic acid to one volume of allyl alcohol, are introduced through lines 1 and 2, respectively, into reaction chamber 3. The formic acid serves as a reagent, as a solvent, and aids in maintaining a low hydrogen peroxide concentration and smoother reaction conditions. Formic acid of a high concentration, desirably in excess of 95%, should be employed because with dilute formic acid an unduly long time is required to complete the reaction as to make the opertion impractical. Hydrogen peroxide of a concentration of about 20–30% in an amount substantially equal to the molal amount of allyl alcohol is slowly added through line 4 into chamber 3 to the mixture of allyl alcohol and formic acid. While hydrogen peroxide of a higher concentration may be empolyed from an economical point of view, it is undesirable because of its greater cost.

Prior art workers (U. S. Patent 2,500,599 issued March 14, 1950) believed it important to carry out the reaction of allyl alcohol and hydrogen peroxide in the presence of large amounts of water to produce glycerin as a direct product from this reaction. In order to accomplish this result, the patentees found it necessary to employ extended periods of time, as long as 10 days, to effect the reaction. Obviously, this operation requiring such unduly long reaction found no commercial application. In contrast, applicants' process is directed to the production of glycerol formates and not glycerin by reaction of allyl alcohol, hydrogen peroxide and formic acid. The conversion of glycerol formate to glycerin is accomplished in a second step by reaction with methyl alcohol. In applicants' process the reaction of allyl alcohol with hydrogen peroxide is completed in about 90 minutes or less. To attain this result applicants found it necessary to limit the amount of water to less than 20% of the total reaction mixture, preferably less than 10%. Stated another way, the reactants, allyl alcohol, hydrogen peroxide and formic should constitute at least 80%, preferably more than 90%, of the total reaction mixture. Constituents other than water in an amount in excess of 20% of the reaction mixture also have a detrimental effect on the process with respect to slowing down the reaction, causing side reaction and creating difficulties in the separation and purification of the desired glycerin product.

The reaction in chamber 3 is exothermic, as a result of which the temperature of the mixture rises. After the temperature has risen to about 45–50° C., it is maintained in that range by means of indirect cooling, as for example, cooling coils in reaction chamber 3, not shown in the drawing. Too high temperatures, in excess of about 70° C., will cause decomposition of the hydrogen peroxide and the formation of unwanted by-products. Usually the reaction will be complete in less than 90 minutes, the completion of the reaction being indicated by the diminution of evolution of heat, or more definitely, by testing a small sample of the mixture for the purpose of ascertaining that the hydrogen peroxide has been consumed. The operation in reaction chamber 3 may be conveniently carried out at atmospheric pressure; superatmospheric pressure is not necessary. Although the mechanism of the reaction between the three components, allyl alcohol, hydrogen peroxide and formic acid, is not known with certainty, the primary products are glycerol formate and, to a lesser extent glycerol diformate. In the operation of the process we have found it necessary to hold the concentration of the hydrogen peroxide in the mixture below about 6%, preferably within the range of about 2–5%, for the reason that high concentrations of hydrogen peroxide, above about 6% in the presence of formic acid, decompose and could produce a minor explosion. Intermittent addition of hydrogen peroxide to the reaction mixture when operating in a batch manner aids in the control of the reaction and minimizes local zones of high concentrations of hydrogen peroxide thereby reducing side reactions and increasing the yield of glycerin. Control of the reaction may also be aided by the intermittent addition of the allyl alcohol to the reaction mixture.

After completion of the reaction, the reaction mixture, consisting primarily of an aqueous solution of formic acid, glycerol formate and glycerol diformate, is withdrawn from reaction chamber 3 through line 5 and introduced into fractionator 6 which may be any conventional fractionating column equipped with the usual bubble-cap trays and steam coil for supplying heat at the bottom of the column. From the top of column 6 is removed a dilute formic acid aqueous solution of a concentration of about 40–50% formic acid. The bottoms in fractionator 6 contain glycerol formate and glycerol diformate together with a small amount of formic acid. Ordinarily, a bottom temperature of about 150° C. and a top temperature of about 105° C. at atmospheric pressure in column 6 will be sufficient to drive off as vapors the bulk of the formic acid in the reaction mixture.

The bottoms containing glycerol formates from fractionator 6 are directed via line 7 to alcoholysis reactor 8 which may be a tower having plates in its upper portion to aid in the separation of methyl formate and water from the glycerin produced by alcoholysis of glycerol formate. To the glycerol formates in reactor 8, methyl alcohol is added through line 9 in an amount at least equal in ester equivalent of the glycerol formates. A small amount of concentrated sulfuric acid, about 0.1% of the mixture of glycerol formate and methanol is added through line 11 to the mixture in reactor 8. The mixture in reactor 8 is then heated by means of a steam coil, not shown in the drawing, to effect alcoholysis of the glycerol formate and simultaneous vaporization of the methyl formate produced by the reaction. The first vapor fraction removed from the reactor 8 through line 12 is substantially pure methyl formate (B. P. 31.5–32° C.). The subsequent vapor fractions released through line 12 are more dilute aqueous solutions of methyl formate. The residue remaining in alcoholysis reactor 8 contains glycerin, together with a small amount of sulfuric acid catalyst and a small amount of formic acid. A sample of the reaction products in chamber 8 may be removed and titrated to determine when alcoholysis is substantially complete.

The residue from reactor 8 containing glycerin and some acid constituents, is directed through line 13 into neutralization chamber 14 which may be simply an empty vessel into which sodium hydroxide in an amount sufficient to neutralize the acid constituents is introduced through line 15 and the mixture therein agitated. The neutralized glycerin is withdrawn from chamber 14 through line 16 and subjected to distillation in a conventional vacuum still 17. Substantially pure glycerin is discharged from vacuum still 17 through line 18 as a product of the process.

Dilute formic acid released from the top of fractionator 6 through line 19 is directed through line 21 into azeotropic distillation column 22 which may be a tower containing a series of bubble-cap plates and a heat exchanger at the bottom of the tower for supplying heat for carrying out the distillation. The primary function of distillation column 22 is to dehydrate the dilute formic acid to produce a concentrated acid which is recycled for further reaction with allyl alcohol and hydrogen peroxide. Although several azeotropic agents such an n-propyl formate, n-propyl ether and allyl ether have been found satisfactory for effecting dehydration of the formic acid, we have found that isopropyl ether accomplishes more efficient and sharper separation of the water from the formic acid than the other azeotropic agents and, therefore, is our preferred entrainer. Vapors of water and isopropyl ether are released from the top of the column 22 through line 23, condensed, and the condensate collected in receiver 24 wherein it separates into two layers, a lower layer of water discharged from the separator through line 25 and an upper layer of isopropyl ether returned via line 26 to the top of column 22 for further azeotropic distillation therein. Small amounts of isopropyl ether are added as make-up ether from an external source through line 27. Dehydrated formic acid as bottoms having a concentration of about 95% formic acid is returned to reaction chamber 3 via lines 28 and 2.

Methyl formate vapors together with some water vapor generated in alcoholysis reactor 8, are transferred through line 12 to hydrolysis chamber 29 which desirably has a series of spaced plates in its upper portion and a heating coil immersed in the body of liquid in the bottom of the chamber. Methyl formate, when heated to a temperature between 75–150° C., preferably 100–105° C., in hydrolysis chamber 29, rapidly hydrolyzes to methanol and formic acid. At the higher temperatures it is desirable to maintain superatmospheric pressure in hydrolysis chamber 29 to control vaporization of the methyl formate. The hydrolysis of methyl formate is facilitated by the addition of water through line 30 to the methyl formate undergoing hydrolysis in chamber 29. As the methyl formate hydrolyzes, the resultant methanol, which carries with it some methyl formate, is vaporized from the top of chamber 29 through line 31, leaving as bottoms a mixture of formic acid, water, together with a small amount of methyl formate and methanol which is withdrawn through line 32. Addition of a trace of $H_2SO_4$ or NaOH as a catalyst to the methyl formate in hydrolysis chamber 29 accelerate the hydrolysis reaction. The mixture of methanol and methyl formate passing through line 31 is subjected to fractionation in conventional fractionator 33 wherein the methyl formate is separated from the mixture and returned via lines 34, 35 and 12 to chamber 29 for further hydrolysis reaction. The methanol bottoms from fractionator 33 are withdrawn through line 9 and returned to alcoholysis reactor 8 for further reaction with glycerol formate.

The mixture of formic acid, methanol, methyl formate and water drawn off from the bottom of hydrolysis chamber 29 is sent through line 32 to conventional fractionator 36 wherein methyl formate and methanol are separated from the mixture and returned through lines 37, 35 and 12 to hydrolysis chamber 29. The bottoms in fractionator 36, a dilute aqueous solution of formic acid of about 30% concentration, is sent through lines 38 and 21 to azeotropic distillation column 22 wherein it is concentrated to about 95% formic acid and then recycled to reaction chamber 3.

Although not shown in the drawing, the usual conventional auxiliary equipment common in industry such as coolers, condensers, temperature controls for regulating the temperature at the top of towers, surge tanks and pumps are employed for facilitating the operation of the process.

The following example illustrates one method of carrying out the invention:

A charge of 46 parts by weight of allyl alcohol and 555 parts by weight of 98% formic acid is placed in a vessel equipped with a stirrer. To this charge is added intermittently, over a period of 15 minutes, 89 parts by weight of 30% hydrogen peroxide and the mixture agitated. Due to the exothermic reaction, the temperature will rise to about 46° C. and is maintained at about that temperature by passing water through a cooling coil immersed in the liquid mixture. The mixture is retained for an additional 70 minutes to complete the reaction. The reaction mixture is then subjected to distillation in a fractionating column to drive off as vapors an aqueous formic acid solution of about 50% concentration. The temperature in the fractionating column should not greatly exceed 150° C. since at appreciably higher temperatures, decomposition occurs. The bottoms containing glycerol formate are then admixed with 120 parts by weight of methyl alcohol and 2 parts by weight of 66° Bé. sulfuric acid and the mixture in a distillation column with reflux, heated to distil methyl formate formed as a result of the reaction. Sodium hydroxide is added to the distillation bottoms to neutralize the small amount of acid therein and neutralized bottoms heated to distil off excess methanol. The advantage of neutralizing prior to distilling the methanol is to minimize decomposition of glycerin which tends to occur to a small extent when heating in the presence of acid. The separated methyl formate together with added water and a trace of $H_2SO_4$ are heated to 105° C. to hydrolyze it to methanol and formic acid, the methanol separated from the formic acid, and the latter dehydrated by azeotropic distillation with isopropyl ether to produce concentrated formic acid, thus making the methanol and concentrated formic acid available for use in further alcoholysis of glycerol formate and hydroxylation of allyl alcohol, respectively. Dilute formic acid recovered in the forepart of the operation is also dehydrated by azeotropic distillation with isopropyl ether and the concentrated formic acid recycled for further hydroxylation of allyl alcohol. After alcoholysis of the glycerol formate with methanol and removal of methyl formate and excess methanol from the mixture, the bottoms containing glycerin are distilled under vacuum to produce substantially pure glycerin. Yield of glycerin based on the allyl alcohol charged, is approximately 94%.

Although certain preferred embodiments of the invention have been disclosed for purpose of illustration it will be evident that various changes and modifications may be made therein without departing from the scope and spirit of the invention.

We claim:

1. A process for the synthesis of glycerin from allyl alcohol which comprises reacting a mixture of allyl alcohol, formic acid and hydrogen peroxide in the proportion of approximately 1 mol of hydrogen peroxide and 9–15 mols formic acid per mol of allyl alcohol, said constituents constituting more than 80% of the total reaction mixture, thereby producing glycerol formates, distilling an aqueous solution of formic acid from the reaction mixture, admixing methyl alcohol with the distillation bottoms containing glycerol formates, heating the mixture to produce glycerin and methyl formate, and separating the glycerin from the methyl formate.

2. A process for the synthesis of glycerin from allyl alcohol which comprises reacting a mixture of allyl alcohol, formic acid and hydrogen peroxide in the proportion of approximately 1 mol of hydrogen peroxide and 9–15 mols formic acid per mol of allyl alcohol, said constituents constituting at least 90% of the total reaction mixture, thereby producing glycerol formates, distilling an aqueous solution of formic acid from the reaction mixture, admixing methyl alcohol with the distillation bottoms containing glycerol formates, heating the mixture to produce glycerin and methyl formate, and separating the glycerin from the methyl formate.

3. A process for the synthesis of glycerin from allyl alcohol which comprises reacting a mixture of allyl alcohol, hydrogen peroxide and formic acid having a concentration in excess of 90% in the proportion of approximately 1 mol of hydrogen peroxide and 9–15 mols formic acid per mol of allyl alcohol, said allyl alcohol, hydrogen peroxide and formic acid constituting at least 90% of the total reaction mixture, thereby producing glycerol formates, distilling an aqueous solution of formic acid from the reaction mixture, admixing methyl alcohol and a small amount of acid with the distillation bottoms containing glycerol formates, and heating the mixture to produce glycerin and methyl formate, separating the methyl formate from the glycerin and hydrolyzing the methyl formate to methanol and formic acid.

4. A process for the synthesis of glycerin from allyl alcohol which comprises reacting a mixture of allyl alcohol, hydrogen peroxide and formic acid having a concentration in excess of 90% in the proportion of approximately 1 mol of hydrogen peroxide and 9–15 mols formic acid per mol of allyl alcohol, said allyl alcohol, hydrogen peroxide and formic acid constituting at least 90% of the total reaction mixture, maintaining the mixture at a temperature below 70° C. for a sufficient length of time to consume substantially all of the hydrogen peroxide and to produce glycerol formates, subjecting the reaction mixture to distillation to remove as vapors a dilute aqueous solution of formic acid from the reaction mixture, dehydrating the dilute formic acid solution to produce concentrated formic acid of at least 90% concentration, recycling the concentrated formic acid for further reaction with allyl alcohol and hydrogen peroxide, admixing with the distillation bottoms containing glycerol formates an amount of methyl alcohol at least equal in ester equivalent of the glycerol formates together with a small amount of acid, heating the mixture to produce glycerin and methyl formate, separating the methyl formate from the glycerin, heating the separated methyl formate to hydrolyze it to methyl alcohol and formic acid, separating the methanol and formic acid resulting from the hydrolysis of the methyl formate, recycling the methanol for further reaction with glycerol formate, dehydrating the formic acid and returning the thus concentrated formic acid for further reaction with additional allyl alcohol and hydrogen peroxide.

5. A process for the synthesis of glycerin from allyl alcohol which comprises admixing allyl alcohol and formic acid having a concentration of at least 95% and an aqueous solution of hydrogen peroxide in the proportion of approximately one mol of hydrogen peroxide and 9–15 mols formic acid per mol of allyl alcohol, said allyl alcohol, formic acid and hydrogen peroxide constituting at least 90% of the total reaction mixture, maintaining the mixture at a temperature between about 40–50° C. for a sufficient length of time to effect substantially complete reaction of the allyl alcohol to produce glycerol formates, subjecting the reaction mixture to distillation to remove as vapors a dilute aqueous soultion of formic acid from the reaction mixture, subjecting the dilute formic acid solution to azeotropic distillation employing isopropyl ether as the entrainer to produce concentrated formic acid, recycling the concentrated formic acid for further reaction with allyl alcohol and hydrogen peroxide, admixing with the distillation bottoms containing glycerol formates a small amount of sulfuric acid and methyl alcohol in an amount at least equal in ester equivalent of the glycerol formates, heating the mixture to convert the glycerol formates to glycerin and methyl formate and simultaneously vaporizing the methyl formate from the mixture, heating the methyl formate to hydrolyze it to methyl alcohol and formic acid and simultaneously vaporizing from the mixture a fraction comprising approximately methanol together with a small amount of methyl formate leaving as bottoms a mixture comprising primarily an aqueous solution of formic acid together with a small amount of methanol and methyl formate, subjecting the methanol-methyl formate fraction to distillation to separate the fraction into the components methanol and methyl formate, returning the methyl formate for further hydrolysis reaction into methanol and formic acid, recycling the methanol for further conversion of glycerol formates to methyl formate and glycerin, subjecting the bottoms containing principally an aqueous solution of formic acid from the hydrolysis reaction to distillation to separate therefrom methyl formate and methanol leaving as bottoms a dilute aqueous solution of formic acid, returning the methyl formate and methanol distillate for further hydrolysis to convert the methyl formate to methyl alcohol and formic acid, subjecting the dilute aqueous formic acid solution bottoms to azeotropic distillation in the presence of isopropyl ether as an entrainer to produce concentrated formic acid and recycling the concentrated formic acid for further reaction with allyl alcohol and hydrogen peroxide.

References Cited in the file of this patent

UNITED STATES PATENTS

| | | |
|---|---|---|
| 2,485,048 | Guinot | Oct. 18, 1949 |
| 2,500,599 | Bergsteinsson et al. | Mar. 14, 1950 |

OTHER REFERENCES

Feiser & Fieser: "Organic Chemistry," pgs. 182 and 183. Publ. in 1944 by D. C. Health & Co. Boston, Mass.